:::

United States Patent Office 2,911,443
Patented Nov. 3, 1959

2,911,443
PREPARATION OF ALCOHOLS

Hugh Wilma Boulton Reed and Paul Otto Lenel, Norton-on-Tees, England, assignors to Imperial Chemical Industries Limited, London, England, a corporation of Great Britain No Drawing. Application January 7, 1957
Serial No. 632,640

Claims priority, application Great Britain
January 20, 1956

3 Claims. (Cl. 260—632)

This invention relates to improvements in the preparation of alcohols by the carbonylation of olefines.

Alcohols may be prepared by reaction between olefines, carbon monoxide, and water, in the presence of a suitable base, and iron pentacarbonyl. The reaction is carried out at elevated temperatures and pressures, and it is usual to include an alcohol, such as methyl alcohol or the alcohol to be produced, as solvent in the reaction mixture. The base used in the reaction is generally organic, such as a tertiary amine. The alcohol obtained in the reaction contains one carbon atom more than the olefine from which it is produced.

It has been observed that reactions of the kind described are in general subject to an initial induction period which is the time during which the reaction vessel is under reaction conditions, before gas absorption is observed. This induction period may be of for example ten hours' duration, or even longer.

We have found that such induction periods may be substantially decreased by the addition to the reaction of a minor quantity of hydrogen, or of a salt of iron hydrocarbonyl.

According to the present invention, therefore, we provide a process for the preparation of alcohols by the reaction of olefines with carbon monoxide and water at superatmospheric pressure and temperature in the presence of a suitable base and iron pentacarbonyl, in which the initial reaction induction period is substantially decreased by the addition to the reaction mixture of a reaction initiator comprising a minor proportion of hydrogen and/or a minor proportion of one or more salts of iron hydrocarbonyl.

A suitable proportion of salts of iron hydrocarbonyl is for example a proportion of between 1% and 20% by weight of the iron carbonyl present.

Suitable salts of iron hydrocarbonyl which may be used as reaction initiators in the process of the present invention include for example, sodium or potassium iron carbonylate and salts with complex cations of transition metals, such as trisethylenediamine-nickel salt of iron hydrocarbonyl, biscyclopentadienyl-iron salt of iron hydrocarbonyl, biscyclopentadienyl-vanadium salt of iron hydrocarbonyl and biscyclopentadienyl-titanium salt of iron hydrocarbonyl, and they may be added as such, or in solution or suspension in a suitable medium.

The proportion of hydrogen which may be added to the reaction mixture is preferably between 4% and 100% by volume of the carbon monoxide introduced into the reaction mixture.

The process of the present invention provides an effective means for preparing alcohols in good yield and, since the induction period is substantially reduced, it permits a higher throughput in a given time than was hitherto possible.

The invention may be applied to the preparation of alcohols from a variety of olefines, for example aliphatic mono-olefines or di-olefines having two isolated double bonds. In the former case, one alcohol group is added, but a dihydric alcohol may be formed from an olefine having two isolated double bonds. Alcohols prepared by the process of the present invention may be purified by, for example, distillation.

Alcohols may be produced by the present invention by a batchwise process, or by a continuous process. It is preferred that the reaction should be carried out at a temperature of between 100 and 200° C., and at a pressure of between 100 and 400 atmospheres. The quantity of iron pentacarbonyl used in the process is preferably between approximately 2% and 100% by weight of the olefine.

It is also preferred that the base used in the reaction should be a tertiary amine, such as for example, trimethylamine, dimethylamino ethanol or N-n-butylpiperidine, and it is further preferred that the quantity of base used should be between 50% and 150% by weight of the iron carbonyl present in the reaction mixture.

We believe that the reaction in the present invention proceeds according to the following theory, but we do not wish this theory to restrict in any way the scope of the invention claimed. In the presence of water and a suitable base, iron pentacarbonyl undergoes the "base-reaction," forming iron hydrocarbonyl:

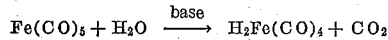

$$Fe(CO)_5 + H_2O \xrightarrow{\text{base}} H_2Fe(CO)_4 + CO_2$$

The base used must be sufficiently strong to catalyze this reaction, but not so strong as to form a stable carbonate, and must be unaffected by the reactants. For these reasons, organic tertiary amines are preferred.

It is considered that the olefine-carbon monoxide reaction is catalyzed by the iron hydrocarbonyl formed according to the above equation.

The reaction shown by the above equation is, however, slow in starting under the reaction conditions generally used, and this retarded formation of iron hydrocarbonyl is believed to explain the induction period which is observed. In the present invention, we may add a salt of iron hydrocarbonyl, which has the effect of initiating the carbonylation reaction, and possibly of stimulating the "base-reaction." When hydrogen is added to the reaction mixture we believe that, contrary to previous opinion, iron hydrocarbonyl is rapidly formed under the reaction conditions from the hydrogen and the iron pentacarbonyl present, and reduces the induction period mentioned.

EXAMPLE

In this example which illustrates the present invention, the carbonylation of propylene was carried out in a silver-lined rocking autoclave of 1 litre capacity under various conditions which are given in the table below. In each case the methanol, water, base, 40 grams of iron pentacarbonyl and iron hydrocarbonyl salt, if any, were charged to the autoclave, which was then cooled to approximately 0° C. and purged with carbon monoxide at 20 atmospheres pressure. The relevant quantity of liquid propylene was then run in and carbon monoxide or carbon monoxide-hydrogen mixture introduced, according to the experiment, to give a gas pressure equivalent to 350 atmospheres at 170° C. The temperature of the autoclave was then raised to 170° C. During each experiment the gas pressure was maintained between 250 and 350 atmospheres by the introduction of more carbon monoxide when necessary. When gas absorption was substantially complete, the autoclave was cooled and the contents discharged. The liquid product was made acid with dilute sulphuric acid, and the upper layer which separated was distilled to give fractions of butanol/water azeotrope boiling at 89° to 92° C. and butanols boiling at 107° to 118° C. Alternatively, the crude product could be fractionally distilled without acidification, thus enabling the tertiary base to be recovered.

In runs 11 and 12, 1 gram of sodium iron carbonylate was added to the reactants in solid form. All the other salts used in the runs were added in the form of methyl alcohol solutions, each containing approximately 1 to 2 grams of salt in 10 to 20 mls. of methyl alcohol. These solutions were prepared by mixing solutions in methyl alcohol of the appropriate hydroxide or chloride of the transition metal complexes with solutions in methyl alcohol of iron hydrocarbonyl or sodium salt of iron hydrocarbonyl.

From the following table it will be seen that the induction period is considerably reduced by the addition of the salts used, or by the presence of hydrogen in the reaction gas. It will also be seen that the actual gas absorption time is also appreciably reduced when the initiators are present.

a catalyst system comprising a tertiary amine and iron pentacarbonyl, the improvement which comprises initiating said reaction by introducing hydrogen gas into the reaction mixture in an amount between 4% and 100% by volume of said carbon monoxide.

3. A process for the preparation of alcohols which comprises reaction of olefins, water and carbon monoxide at superatmospheric pressure between about 100 and 400 atmospheres and a temperature between 100° and 200° C. in the presence of a catalyst system comprising iron pentacarbonyl in an amount of from 2% to 100% by weight of olefin, and a tertiary amine in an amount between 50% and 150% by weight of said iron pentacarbonyl, and initiating said reaction by introducing hydrogen gas into the reaction mixture in an amount between 4% and 100% by volume of said carbon monoxide.

Table.—Carbonylation of propylene

| Run | Base | Wt. of base, gms. | Wt. of methanol, gms. | Wt. of water, gms. | Wt. of propylene, gms. | Initiator | Initial pressure, ats. | Gas absorption, ats. | Induction period, hrs. | Gas absorption time, hrs. | Pass yield of butanols, percent |
|---|---|---|---|---|---|---|---|---|---|---|---|
| 1 | M | 54 | 64 | 46 | 150 | None | 180 CO | 157 | 9 | 37 | 52 based on CO. |
| 2 | M | 54 | 64 | 46 | 50 | None | 160 CO | 79 | 5 | 36 | 30.5 based on $C_3H_6$. |
| 3 | M | 54 | 64 | 46 | 50 | Hydrogen | 130 CO, 50 $H_2$ | 121 | 1 | 9 | 68.8 based on $C_3H_6$. |
| 4 | M | 54 | 64 | 46 | 50 | Hydrogen | 160 CO | 168 | 2 | 12 | 89.8 based on $C_3H_6$. |
| 5 | M | 54 | 64 | 46 | 50 | Hydrogen | 140 CO | 72 | 1½ | 4 | 73.8 based on $C_3H_6$. |
| 6 | M | 54 | 64 | 46 | 50 | Hydrogen | 120 CO | 87 | 1 | 9 | 67.3 based on $C_3H_6$. |
| 7 | M | 54 | 64 | 46 | 50 | N | 180 CO | 86 | 1½ | 20 | 42.2 based on $C_3H_6$. |
| 8 | M | 54 | 64 | 46 | 50 | I | 180 CO | 80 | 1 | 20 | 24.6 based on $C_3H_6$. |
| 9 | M | 54 | 64 | 46 | 50 | V | 180 CO | 40 | ½ | 9 | 18.8 based on $C_3H_6$. |
| 10 | M | 54 | 64 | 46 | 50 | T | 180 CO | 79 | 2 | 22 | 31.9 based on $C_3H_6$. |
| 11 | DMA | 80 | 48 | 50 | 50 | S | 180 CO | 102 | 1 | 24 | 62.1 based on $C_3H_6$. |
| 12 | BP | 80 | 48 | 40 | 50 | Hydrogen+S | 150 CO, 30 $H_2$ | 33 | 0 | (¹) | 5.1 based on $C_4H_8$. |

¹ Reaction stopped before completion.
M, Trimethylamine.
DMA, Dimethylamino ethanol.
BP, N-n-butylpiperidine.
N, Trisethylenediamine-nickel salt of iron hydrocarbonyl.
I, Biscyclopentadienyl-iron salt of iron hydrocarbonyl.
V, Biscyclopentadienyl-vanadium salt of iron hydrocarbonyl.
T, Biscyclopentadienyl-titanium salt of iron hydrocarbonyl.
S, Sodium salt of iron hydrocarbonyl.

We claim:
1. In a process for the preparation of alcohols by the reaction of olefins, water and carbon monoxide at superatmospheric pressure and temperature in the presence of a catalyst system comprising a tertiary amine and iron pentacarbonyl, the improvement which comprises intiating said reaction by introducing hydrogen gas into the reaction mixture.

2. In a process for the preparation of alcohols by the reaction of olefins, water and carbon monoxide at superatmospheric pressure and temperature in the presence of References Cited in the file of this patent

UNITED STATES PATENTS 2,689,261   Reppe _____ Sept. 14, 1954

OTHER REFERENCES

Reppe: "Acetylene Chemistry," P.B. 18852–5, Charles A. Meyer & Co., Inc., N.Y., 1949, pp. 190–1.

Copenhaver et al.: "Acetylene and CO Chemistry," Reinhold, N.Y., 1949, pp. 98–101 and 287–291.

Reppe et al.: Annalen der Chemie, Band 582, 1/2, pp. 120–1, 133–4, 144–5.